United States Patent
Tsuji et al.

(10) Patent No.: US 10,843,470 B2
(45) Date of Patent: Nov. 24, 2020

(54) INKJET RECORDING METHOD AND INKJET RECORDING APPARATUS

(71) Applicant: CANON KABUSHIKI KAISHA, Tokyo (JP)

(72) Inventors: Shinsuke Tsuji, Kawasaki (JP); Yukako Tamanuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/258,844

(22) Filed: Jan. 28, 2019

(65) Prior Publication Data

US 2019/0232666 A1 Aug. 1, 2019

(30) Foreign Application Priority Data

Jan. 31, 2018 (JP) ................. 2018-015199

(51) Int. Cl.
*B41J 2/175* (2006.01)
*B41J 2/18* (2006.01)
(Continued)

(52) U.S. Cl.
CPC .............. *B41J 2/175* (2013.01); *B41J 2/18* (2013.01); *B41M 5/0023* (2013.01);
(Continued)

(58) Field of Classification Search
CPC ................. B41J 2/195; B41J 2002/14354
See application file for complete search history.

(56) References Cited

U.S. PATENT DOCUMENTS 4,130,126 A * 12/1978 Chocholaty .............. B41J 2/195
101/364
4,445,124 A * 4/1984 Fujii ......................... B41J 2/18
346/100
(Continued)

FOREIGN PATENT DOCUMENTS

CN 1690134 A 11/2005
CN 102234455 A 11/2011
(Continued)

OTHER PUBLICATIONS

May 28, 2019 extended European Search Report in European Patent Appln. No. 19154387.5.
(Continued)

*Primary Examiner* — Shelby L Fidler
(74) *Attorney, Agent, or Firm* — Venable LLP

(57) ABSTRACT

Inkjet recording is performed by using an inkjet recording apparatus including an ink circulation channel for circulating a first ink, an ink supply channel for supplying a second ink into the ink circulation channel, and a recording head communicating with the ink circulation channel. The apparatus is configured to eject an aqueous ink including the first ink and the second ink from the recording head, thereby recording an image on a recording medium. The content (% by mass) of water in the first ink and the content (% by mass) of water in the second ink differ from each other by 2.00% by mass or more. The first ink contains a resin, and the second ink contains a first water-soluble organic solvent having a Log P value of less than −1.10.

13 Claims, 1 Drawing Sheet

(51) Int. Cl.
*C09D 11/104* (2014.01)
*B41M 5/00* (2006.01)
*C09D 11/322* (2014.01)

(52) U.S. Cl.
CPC .......... *C09D 11/104* (2013.01); *C09D 11/322* (2013.01); *B41J 2202/12* (2013.01)

(56) References Cited

U.S. PATENT DOCUMENTS

| | | | | |
|---|---|---|---|---|
| 4,580,413 A | * | 4/1986 | Klee | F25D 3/11 49/116 |
| 4,836,852 A | * | 6/1989 | Knirsch | C09D 11/30 106/31.33 |
| 5,958,122 A | * | 9/1999 | Fukuda | B41J 2/01 106/31.57 |
| 2005/0235871 A1 | | 10/2005 | Kato et al. | |
| 2010/0075050 A1 | | 3/2010 | Tojo et al. | |
| 2010/0165020 A1 | | 7/2010 | Tojo et al. | |
| 2011/0261107 A1 | | 10/2011 | Hara et al. | |
| 2017/0165979 A1 | | 6/2017 | Ohta | |
| 2018/0273786 A1 | | 9/2018 | Nushiro et al. | |

FOREIGN PATENT DOCUMENTS

| | | |
|---|---|---|
| JP | 2003-326692 A | 11/2003 |
| JP | 2010-077259 A | 4/2010 |
| JP | 2017-109485 A | 6/2017 |
| WO | 2016/092310 A1 | 6/2016 |

OTHER PUBLICATIONS

European Office Action issued in corresponding European Application No. 19154387.5 dated Apr. 16, 2020.

Chinese Office Action issued in corresponding Chinese Application No. 201910092502.4 dated Jul. 21, 2020.

* cited by examiner

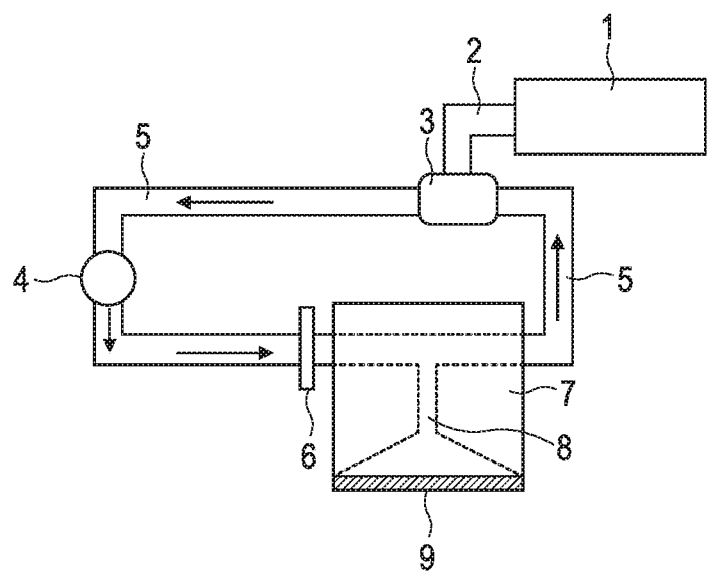

INKJET RECORDING METHOD AND INKJET RECORDING APPARATUS

BACKGROUND OF THE INVENTION

Field of the Invention

The present invention relates to an inkjet recording method and an inkjet recording apparatus.

Description of the Related Art

In recent years, opportunities of using an inkjet recording apparatus in a commercial printing field and in an office printing field have been increasing. Reducing the number of recovery actions such as preliminary ejection is required for an inkjet recording apparatus to be used in the commercial printing field and in the office printing field in order to record an image at a high speed. The preliminary ejection is performed for suppressing deterioration of ejection properties due to an increase in viscosity of an ink at an ejection orifice having a low frequency of ink ejection and is one of the processes for recovering an ejection orifice. It is known that an ink is circulated in an ink circulation channel including a recording head in order to suppress the deterioration of ejection properties due to an increase in viscosity of the ink at an ejection orifice having a low frequency of ink ejection (see Japanese Patent Application Laid-Open No. 2010-77259).

SUMMARY OF THE INVENTION

The present inventors have recorded images over a long period of time using an inkjet recording apparatus which can circulate an ink in an ink circulation channel including a recording head as described in Japanese Patent Application Laid-Open No. 2010-77259. As a result, it has been found that the ejection stability of the ink is not obtained in some cases.

Accordingly, an object of the present invention is to provide an inkjet recording method by which the ejection stability of an ink is obtained even in a case where images are recorded over a long period of time. In addition, another object of the present invention is to provide an inkjet recording apparatus using the inkjet recording method.

The present invention provides an inkjet recording method which includes ejecting an aqueous ink using an inkjet recording apparatus including an ink circulation channel in which a first ink circulates, an ink supply channel supplying a second ink into the ink circulation channel, and a recording head communicating with the ink circulation channel, the inkjet recording apparatus being configured to eject the aqueous ink including the first ink and the second ink from the recording head, thereby recording an image on a recording medium, wherein a difference between a content (% by mass) of water in the first ink and a content (% by mass) of water in the second ink is 2.00% by mass or more, the first ink contains a resin, and the second ink contains a first water-soluble organic solvent having a Log P value of less than −1.10.

In addition, the present invention provides an inkjet recording apparatus including an ink circulation channel for circulating a first ink, an ink supply channel for supplying a second ink into the ink circulation channel, and a recording head communicating with the ink circulation channel, and the apparatus being configured to eject an aqueous ink including the first ink and the second ink from the recording head, wherein a difference between a content (% by mass) of water in the first ink and a content (% by mass) of water in the second ink is 2.00% by mass or more, the first ink contains a resin, and the second ink contains a first water-soluble organic solvent having a Log P value of less than −1.10.

According to the present invention, an inkjet recording method and an inkjet recording apparatus by which the ejection stability of an ink is obtained even in a case where images are recorded over a long period of time are provided.

Further features of the present invention will become apparent from the following description of exemplary embodiments with reference to the attached drawing.

BRIEF DESCRIPTION OF THE DRAWINGS

FIGURE is a schematic diagram illustrating one example of an inkjet recording apparatus which can circulate an ink in an ink circulation channel including a recording head.

DESCRIPTION OF THE EMBODIMENTS

Preferred embodiments of the present invention will now be described in detail in accordance with the accompanying drawing.

Hereinafter, embodiments of the present invention will be described in detail. In the present invention, an aqueous ink may be hereinafter referred to as "ink". Various physical property values are those at a temperature of 25° C. unless otherwise noted. The terms "(meth)acrylic acid" and "(meth)acrylate", when occurring in the description, represent "acrylic acid or methacrylic acid" and "acrylate or methacrylate" respectively. Any of the first ink and the second ink is an aqueous ink.

An inkjet recording apparatus includes an ink circulation channel for circulating an ink, an ink supply channel for supplying an ink into the ink circulation channel, and a recording head communicating with the ink circulation channel. Thereby, the ink in the ink circulation channel including the recording head can be circulated. When images are recorded over a long period of time using this inkjet recording apparatus, the ink circulates in the ink circulation channel over a long period of time. Therefore, water in the circulating ink gradually evaporates from an ejection orifice and the like. Thereby, the content of water in the ink gradually becomes lower in the circulating ink than in an ink to be newly supplied into the ink circulation channel, thus the circulating ink being concentrated. Accordingly, inks having different contents of water exist in the ink circulation channel and the ink supply channel in the inkjet recording apparatus. In the present invention, the ink which is circulating in the ink circulation channel is referred to as the first ink, and the ink to be supplied into the ink circulation channel is referred to as the second ink.

As a result of studies conducted by the present inventors, it has been found that in a case where a first ink and a second ink having different contents of water exist in an ink circulation channel and an ink supply channel respectively in an inkjet recording apparatus, it becomes hard for the ink to be supplied into the recording head, and ejection stability of the ink is not obtained. Particularly in a case where the difference between the content of water in the first ink and the content of water in the second ink is 2.00% by mass or more, it has also been found that deterioration of the ejection stability of the ink remarkably occurs. The reason is explained in the below. It is to be noted, meanwhile, that the difference in the content of water between the first ink and the second ink can be determined by measuring the content of water in each ink by a Karl Fischer method.

When the first ink contains a resin, marker resistance of a recorded image is improved. However, when water in the ink evaporates from an ejection orifice and the like, the content of water in the ink thereby becomes low in the first ink circulating over a long period of time, so that the first ink is concentrated. When the content of the resin in the first ink becomes relatively high, the viscosity of the first ink thereby becomes high to lower the fluidity of the first ink. On the other hand, the second ink to be supplied into the ink circulation channel, which is different from the first ink which is circulating, is an unconcentrated ink. Therefore, the viscosity of the ink is lower and the fluidity of the ink is higher in the second ink than in the first ink.

In this way, in the ink circulation channel, the second ink having a relatively low viscosity easily flows, but it is hard for the first ink having a relatively high viscosity to flow. Therefore, the first ink is retained in the ink circulation channel, and when water further evaporates from the retained first ink, the first ink is further concentrated to block up the ink circulation channel in some cases. Thereby, it becomes hard for the ink to be supplied into the recording head, and therefore the ejection stability of the ink is not obtained. In this way, when it becomes hard for the ink to be ejected from the recording head, an unrecorded region thereby exists in an image. Particularly in a case where the inkjet recording apparatus is used in a low temperature environment, the fluidity of the first ink is more easily lowered, and therefore the first ink is liable to be retained in the ink circulation channel to remarkably bring about the problem of deterioration of the ejection stability of the ink.

Thus, the present inventors allow the second ink to contain a first water-soluble organic solvent having a Log P value of less than −1.10 in order to solve the problem of deterioration of the ejection stability of the ink brought about when the first ink and the second ink having a difference in the content of water co-exist. Explanation more in detail follows.

The Log P value is an index showing the polarity of a water-soluble organic solvent. When this value is large, the polarity is low, and when this value is small, the polarity is high. As the first water-soluble organic solvent has a Log P value of less than −1.10, it has a high hydrophilicity. Generally, a resin for use in an aqueous ink has a hydrophilic unit in order to make it easy to blend compatibly with water. Thereby, it is easy for the resin in the first ink and the first water-soluble organic solvent having a high hydrophilicity in the second ink to blend compatibly with each other, and therefore it becomes easy for the first ink and the second ink to mix. The first ink becomes hard to retain in the ink circulation channel, and therefore it becomes hard for the ink circulation channel to be blocked up, so that the ejection stability of the ink is obtained.

In addition, it is hard for the first ink and the second ink to mix in some cases by only bringing the first ink and the second ink into contact with each other. When the ink is circulated to apply shear force to the ink, and the viscosity of the first ink thereby becomes low, the first ink and the second ink mix quickly. Thereby, the ejection stability of the ink is obtained, and a phenomenon that an unrecorded region occurs in an image can be suppressed.

<Inkjet Recording Method>

An inkjet recording method according to the present invention records an image on a recording medium by ejecting an ink from a recording head. Examples of a system of ejecting an ink include a system of imparting mechanical energy to an ink and a system of imparting thermal energy to an ink. In the present invention, the system of imparting thermal energy to an ink, thereby ejecting the ink can preferably be adopted.

<Inkjet Recording Apparatus>

As the recording head, a serial type recording head (serial head) and a line type recording head (line head) can be used. Among others, in the present invention, a line head can advantageously be adopted. A line head has ejection orifices for ejecting an ink which are disposed over the whole width of a recording medium and therefore can perform image recording at a high speed.

FIGURE is a schematic diagram illustrating one example of an inkjet recording apparatus which can circulate an ink in an ink circulation channel including a recording head. Both a main tank 1 and a sub-tank 3 have a function as an ink storage section. An ink fed from the main tank 1 to the sub-tank 3 through an ink supply channel 2 flows through an ink circulation channel 5 in the direction indicated by arrows in the FIGURE by a circulation pump 4 as a unit of circulating the ink and is fed to a recording head 7 via a filter 6. In a case where the ink is ejected from the recording head 7 based on image data, the ink flows through an ink flow channel 8 in the recording head 7, and an image is recorded on a recording medium (not shown in the FIGURE) by ejecting the ink from the ejection orifices formed at an ejection orifice face 9. In addition, the ink may also be discharged from the recording head 7 based on a preliminary ejection data. The ink not discharged outside the apparatus for the purpose of image recording, preliminary ejection, or the like comes back in the ink circulation channel 5 again to be fed to the sub-tank 3. In this way, when the ink circulates between the sub-tank 3 and the recording head 7, the ink in the ink circulation channel including the recording head can be circulated. The flow speed (flow rate) during circulation may be appropriately decided according to the constitution of the apparatus, and is preferably set to 1 to 50 mL/min, and more preferably 1 to 10 mL/min, for example.

The mass (g) of the ink which can be stored in the main tank can be 80 g or more to 600 g or less. The mass (g) of the ink in the other parts of the apparatus which include the recording head and the ink circulation channel can be 140 g or more to 150 g or less.

In addition, in a case where deaeration is performed while the ink is circulated in the ink circulation channel, water in the ink is particularly liable to evaporate from an ejection orifice and the like, and the difference in the content of water between the first ink and the second ink is liable to become large in the ink circulation channel and the ink supply channel in the ink jet recording apparatus. Examples of the method of deaerating the ink in the inkjet recording apparatus include a method of reducing pressure in an ink storage section. Examples of the method of reducing pressure in the ink storage section include a method of reducing pressure in the main tank or the sub-tank and a method in which an ink storage section other than the main tank and the sub-tank is provided in the ink circulation channel, and the pressure of the ink storage section is reduced. The ink in the ink storage section may be stirred using a stirrer or the like, or the ink storage section may be vibrated in order to increase the surface area of liquid and make air bubbles to be easily removed. Among others, the method of deaerating the ink is preferably a method of reducing pressure in the sub-tank, and more preferably a method of reducing pressure by a deaeration pump connected to the sub-tank.

<Ink>

The first ink contains a resin. The second ink contains a first water-soluble organic solvent having a Log P value of less than −1.10. The ink for use in the present invention does not have to be an ink which is cured by energy such as an ultraviolet ray.

The first ink is usually a concentrated ink having a lower content of water than the second ink. The first ink and the second ink may have almost the same components other than water. That is, both the first ink and the second ink may contain a resin and a first water-soluble organic solvent. Further, the contents of components other than water in the first ink and in the second ink can be almost the same, and the difference in each contents of the components other than water between the first ink and the second ink can be ±0.50% or less. Particularly, when the first ink contains a first water-soluble organic solvent, the resin and the first water-soluble organic solvent in the first ink blend compatibly with each other, the first ink thereby becomes hard to retain, and therefore the ejection stability of the ink is improved.

Hereinafter, while the contents and the ratios of respective components in the ink will be described, those values are for the second ink, which is not concentrated. Since the contents of components other than water are almost the same in the first ink and the second ink, the preferred ranges of the contents and the ratios of components other than water are almost the same in the first ink and the second ink.

(Pigment)

From the viewpoint of light fastness and water fastness, the ink can contain a pigment. Specific examples of the pigment include: inorganic pigments such as carbon black and titanium oxide; and organic pigments such as azo, phthalocyanine, quinacridone, isoindolinone, imidazolone, diketopyrrolopyrrole and dioxazine pigments.

As a pigment dispersion system, a resin-dispersed pigment using a resin as a dispersant and a self-dispersible pigment having a hydrophilic group bonded to the surface of pigment particles can be used. In addition, a resin-bonded type pigment obtained by chemically bonding an organic group containing a resin to the surface of pigment particles, a microcapsule pigment obtained by covering the surface of pigment particles with a resin or the like, etc. can be used. Plural pigments obtained by different dispersion methods can be used together.

The content of the pigment in the ink is preferably 0.10% by mass or more to 15.00% by mass or less, and more preferably 1.00% by mass or more to 11.00% by mass or less based on the total mass of the ink.

(Resin)

The ink contains a resin. The resin can be added to the ink for the reasons such as (i) making the dispersion state of the pigment stable, namely using as a resin dispersant or an assistant thereof and (ii) improving various properties of a recorded image. Both in a case where the resin is used as a dispersant for the pigment and in a case where the resin is used as an additive for the ink, when the resin is contained in the ink, the fluidity of the ink becomes low because the ink is concentrated due to circulation of the ink, and therefore the problem of deterioration of the ejection stability of the ink occurs.

Examples of the form of the resin include a block copolymer, a random copolymer, a graft copolymer, and combinations thereof. In addition, the resin may be in a state of dissolving in an aqueous medium as a water-soluble resin or in a state of dispersing in an aqueous medium as a resin particle. Among others, the resin can be a water-soluble resin. The water-soluble resin can form a stronger resin film than the resin particle because the resins are entangled more quickly and easily accompanied by penetration of liquid components in the ink into a recording medium, and therefore marker resistance is improved. Also, in a case where the ink containing a resin-dispersed pigment and a resin is used, any of the resins to be used as a dispersant and as an additive can be a water-soluble resin.

In the present invention, that a resin is water-soluble is that the resin does not form a particle whose particle diameter can be measured by a dynamic light scattering method in a case where the resin is neutralized with an alkali in an amount corresponding to the acid value of the resin. Whether a resin is water-soluble or not can be determined by the following method. First, a liquid containing a resin (solid content of resin: 10% by mass) neutralized with an alkali (such as sodium hydroxide or potassium hydroxide) in an amount corresponding to the acid value is prepared. Subsequently, the prepared liquid is diluted 10 times (based on volume) with pure water to prepare a sample solution. The resin can be rated as water-soluble in a case where a particle having a particle diameter is not measured when the particle diameter of the resin in the sample solution is measured by a dynamic light scattering method. The measurement conditions on this occasion can be set as, for example, SetZero: 30 seconds, number of times of measurement: 3 times, and measurement time: 180 seconds. As a particle size distribution measurement apparatus, a particle size analyzer using a dynamic light scattering method (for example, trade name "UPA-EX150," manufactured by NIKKISO CO., LTD.) and the like can be used. As a matter of course, the particle size distribution measurement apparatus to be used, measurement conditions and the like are not limited to those described above.

From the viewpoint of the marker resistance of an image, the resin can be at least one selected from the group consisting of an acrylic resin and a urethane resin. Hereinafter in the present invention, a "unit" which the resin has denotes a repeating unit derived from one monomer. It is not preferable to use an active energy ray-curable type resin, namely a resin having a polymerizable group, as the resin.

[Acrylic Resin]

The acrylic resin can have a hydrophilic unit and a hydrophobic unit as constituent units. Among others, the acrylic resin can be a resin having a hydrophilic unit derived from a (meth)acrylic acid and a hydrophobic unit derived from at least one of monomers of styrene and α-methylstyrene. These resins easily cause interaction with a pigment and therefore can be suitably used as a resin dispersant for dispersing the pigment.

The hydrophilic unit is a unit having a hydrophilic group such as an anionic group. The hydrophilic unit can be formed, for example, by polymerizing a hydrophilic monomer having a hydrophilic group. Specific examples of the hydrophilic monomer having a hydrophilic group include acidic monomers having a carboxylic acid group, such as (meth)acrylic acid, itaconic acid, maleic acid and fumaric acid, and anionic monomers such as anhydrides or salts of these acidic monomers. Examples of a cation constituting a salt of an acidic monomer include ions of lithium, sodium, potassium, ammonium and organic ammonium. The hydrophobic unit is a unit not having a hydrophilic group such as an anionic group. The hydrophobic unit can be formed, for example, by polymerizing a hydrophobic monomer not having a hydrophilic group such as an anionic group. Specific examples of the hydrophobic monomer include: monomers having an aromatic ring, such as styrene, α-methylstyrene and benzyl (meth)acrylate; and (meth)acrylic acid ester-based monomers such as methyl (meth)acrylate, butyl (meth)acrylate and 2-ethylhexyl (meth)acrylate.

The proportion (mol %) of the hydrophilic unit in the resin is preferably 5 mol % or more to 30 mol % or less, and the proportion (mol %) of the hydrophobic unit in the resin is preferably 70 mol % or more to 95 mol % or less.

The acid value (mgKOH/g) of the acrylic resin is preferably 60 mgKOH/g or more to 300 mgKOH/g or less. When the acid value is less than 60 mgKOH/g, the acrylic resin has a low hydrophilicity, and therefore it is hard for the acrylic resin to blend compatibly with the first water-soluble organic solvent, so that it is hard for the first ink and the second ink to mix. Therefore, the ejection stability of the ink is not obtained sufficiently in some cases. When the acid value exceeds 300 mgKOH/g, the resin has a high hydrophilicity, and therefore it is hard for water to separate from the resin after the ink adheres to a recording medium, so that the marker resistance of an image is not obtained sufficiently in some cases. The acid value of the acrylic resin can be measured by colloidal titration utilizing potential difference.

The weight average molecular weight of the acrylic resin in terms of polystyrene obtained by gel permeation chromatography (GPC) is preferably 3,000 or more to 15,000 or less.

[Urethane Resin]

The urethane resin is synthesized using at least a polyisocyanate and a component (polyol or polyamine) which is reactive to the polyisocyanate, and if necessary, a crosslinker and a chain extender are also used. The urethane resin can have a unit derived from a polyisocyanate and a polyol containing a polyol having an acid group. Hereinafter, each monomer to be a constituent unit of the urethane resin will be described.

[Polyisocyanate]

The "polyisocyanate" in the present invention means a compound having two or more isocyanate groups within a molecule in order to react with a polyol, a polyamine and the like. The proportion of the unit derived from a polyisocyanate in the resin is preferably 10 mol % or more to 60 mol % or less. Examples of the polyisocyanate include aliphatic or aromatic polyisocyanates.

Examples of the aliphatic polyisocyanates include: polyisocyanates having a chain structure, such as tetramethylene diisocyanate, hexamethylene diisocyanate and dodecamethylene diisocyanate; and polyisocyanates having a cyclic structure, such as isophorone diisocyanate, hydrogenated xylylene diisocyanate and 4,4'-dicyclohexylmethane diisocyanate. Examples of the aromatic polyisocyanates include tolylene diisocyanate, 2,2'-diphenylmethane diisocyanate and 2,4'-diphenylmethane diisocyanate.

Among others, the polyisocyanate is preferably an aliphatic polyisocyanate and is more preferably at least one selected from the group consisting of isophorone diisocyanate and hexamethylene diisocyanate.

[Polyol]

As the component to be a unit constituting the urethane resin by a reaction with the polyisocyanate, a polyol can be used. The "polyol" in the present invention means a compound having two or more hydroxy groups in a molecule, and examples thereof include: polyols not having an acid group, such as polyether polyols, polyester polyols and polycarbonate polyols; and polyols having an acid group. The polyols can be used singly, or if necessary, two or more of the polyols can be used. The proportion (mol %) of the unit derived from a polyol in the resin is preferably 40 mol % or more to 90 mol % or less.

Examples of the polyol include: polyols not having an acid group, such as polyether polyols, polyester polyols and polycarbonate polyols; and polyols having an acid group such as a carboxylic acid group, a sulfonic acid group, a phosphoric acid group and a phosphonic acid group.

The polyol not having an acid group can be a polyether polyol. Examples of the polyether polyol include: products of addition polymerization of an alkylene oxide and a polyol; and glycols such as (poly)alkylene glycols. Examples of the alkylene oxide include ethylene oxide, propylene oxide and butylene oxide. In addition, examples of the polyol undergoing addition polymerization with the alkylene oxide include 1,3-propanediol, 1,3-butanediol and 1,4-butanediol. Examples of the glycol include: (poly)alkylene glycols such as polyethylene glycol, propylene glycol and polypropylene glycol; and ethylene glycol-propylene glycol copolymers.

In the polyol, the proportion (mol %) of the polyol not having an acid group is preferably 50 mol % or more to 80 mol % or less.

The polyol having an acid group can be a polyol having a carboxylic acid group. Examples of the polyol having a carboxylic acid group include dimethylol acetic acid, dimethylol propionic acid and dimethylol butanoic acid. Among others, the polyol having an acid group can be dimethylol propionic acid. The acid group in the polyol having an acid group may be in the form of a salt, and examples of a cation forming a salt include ions of alkali metals such as lithium, sodium and potassium, ammonium ions, and cations of organic amines such as dimethylamine. It is to be noted that the molecular weight of a general purpose polyol having an acid group is about 400 at the highest, and therefore the unit derived from a polyol having an acid group basically becomes a hard segment of the urethane resin.

In the polyol, the proportion (mol %) of the polyol having an acid group is preferably 20 mol % or more to 50 mol % or less.

The acid value (mgKOH/g) of the urethane resin is preferably 50 mgKOH/g or more to 100 mgKOH/g or less. When the acid value is less than 50 mgKOH/g, the urethane resin has a low hydrophilicity, and therefore it is hard for the urethane resin to blend compatibly with the first water-soluble organic solvent, so that it is hard for the first ink and the second ink to mix. Therefore, the ejection stability of the ink is not obtained sufficiently in some cases. When the acid value exceeds 100 mgKOH/g, the resin has a high hydrophilicity, and therefore it is hard for water to separate from the resin after the ink adheres to a recording medium, so that the marker resistance of an image is not obtained sufficiently in some cases. The acid value of the urethane resin can be measured by colloidal titration utilizing potential difference.

The content (% by mass) of the resin in the ink is preferably 1.00% by mass or more to 8.00% by mass or less based on the total mass of the ink. In a case where a resin dispersant is used as the resin, the mass ratio of the content (% by mass) of the resin dispersant to the content (% by mass) of the pigment is preferably 0.10 times or more to 5.00 times or less.

The weight average molecular weight of the urethane resin in terms of polystyrene obtained by gel permeation chromatography (GPC) is preferably 25,000 or more to 75,000 or less.

(Water-Soluble Organic Solvent)

The Log P (Log Pow) value used as an index showing the polarity of a water-soluble organic solvent will be described. The Log P value refers to a partition coefficient between water and octanol (1-octanol). The Log P value represents a physical property relating to how easily an object substance blend compatibly with water, and as this value becomes larger, the polarity becomes lower. The Log P value is calculated in accordance with the definition Log P=Log$_{10}$ $C_o/C_w$ ($C_o$ represents the concentration of the object substance in octanol phase and $C_w$ represents the concentration of the object substance in water phase). The Log P value can also be obtained experimentally by the method described in JIS Z 7260-107. In addition, the Log P value can also be obtained utilizing commercially available calculation software such as trade name "ACD/PhysChem Suite" (manufactured by ACD/Labs). In Examples, which will be described later, values obtained using trade name "ACD/PhysChem Suite Version 12.00" (manufactured by ACD/Labs) are adopted.

The term "water-soluble organic solvent" usually denotes a liquid, but in the present invention, a water-soluble organic substance which is solid at a temperature of 25° C. is also included in the water-soluble organic solvent. The water-soluble organic solvent to be contained in the ink can have a vapor pressure at 25° C. lower than the vapor pressure at 25° C. of water. Specific examples of the water-soluble organic solvent include the following compounds (numerical values in parentheses represents Log P values). Polyethylene glycol having a number average molecular weight of 1,000 (−6.35), polyethylene glycol having a number average molecular weight of 400 (−2.82), polyethylene glycol having a number average molecular weight of 200 (−1.88), tetraethylene glycol (−1.88), bishydroxyethylsulfone (−1.86), glycerin (−1.85), urea (−1.66), triethylene glycol (−1.65), diethylene glycol (−1.41), 1,2,6-hexanetriol (−1.39), ethylene glycol (−1.36), ethylene urea (−1.24), 1,3-propanediol (−1.09), 2-pyrrolidone (−1.09), 1,2-propane diol (−1.01), trimethylolpropane (−0.97), 1,4-butanediol (−0.77), triethylene glycol monoethyl ether (−0.66), N-methyl-2-pyrrolidone (−0.64), γ-butyrolactone (−0.63), δ-valerolactam (−0.57), 1,5-pentanediol (−0.56), 3-methyl-1,5-pentanediol (−0.21), δ-valerolactone (−0.10), 1,6-hexanediol (−0.05), isopropanol (0.18), triethylene glycol monobutyl ether (0.36), 1,2-hexanediol (0.52), ethylene glycol monobutyl ether (0.83), 1-pentanol (1.35), 1,2-octanediol (1.54) and tripropylene glycol monobutyl ether (1.66) are given as examples.

[First Water-Soluble Organic Solvent]

The ink contains a first water-soluble organic solvent having a Log P value of less than −1.10. The Log P value of the first water-soluble organic solvent is preferably −1.20 or less, preferably −6.50 or more, and more preferably −2.00 or more.

Specific examples of the first water-soluble organic solvent include the following compounds (numerical values in parentheses represents Log P values). Polyethylene glycol having a number average molecular weight of 1,000 (−6.35), polyethylene glycol having a number average molecular weight of 400 (−2.82), polyethylene glycol having a number average molecular weight of 200 (−1.88), tetraethylene glycol (−1.88), bishydroxyethylsulfone (−1.86), glycerin (−1.85), urea (−1.66), triethylene glycol (−1.65), diethylene glycol (−1.41), 1,2,6-hexanetriol (−1.39), ethylene glycol (−1.36) and ethylene urea (−1.24) are given as examples.

The first water-soluble organic solvent has a high hydrophilicity. Therefore, it is hard for the first water-soluble organic solvent to release water and the first water-soluble organic solvent is easily movable after the ink adheres to a recording medium, and therefore when the first water-soluble organic solvent is used, there is a tendency that the marker resistance of an image is somewhat lowered. However, when the first water-soluble organic solvent has a large molecular weight, it is hard for the first water-soluble organic solvent in the ink to move after the ink adheres to a recording medium, and therefore the marker resistance of an image is improved. The first water-soluble organic solvent having a large molecular weight can be polyethylene glycol having three or more ethylene oxide structures. Thereby, it is hard for the first water-soluble organic solvent to move after the ink adheres to a recording medium, so that the marker resistance of an image is improved.

The content (% by mass) of the first water-soluble organic solvent in the ink is preferably 1.00% by mass or more to 30.00% by mass or less, and more preferably 5.00% by mass or more to 30.00% by mass or less based on the total mass of the ink.

The mass ratio (times) of the content (% by mass) of the first water-soluble organic solvent to the content (% by mass) of the resin can be 1.85 times or more to 25.00 times or less. When the ratio is less than 1.85 times, the amount of the first water-soluble organic solvent is small based on the amount of the resin, and therefore it is hard for the resin in the first ink to blend compatibly with the first water-soluble organic solvent in the second ink, so that it is hard for the first ink and the second to mix. Thereby, the ejection stability of the ink is not obtained sufficiently in some cases. When the ratio exceeds 25.00 times, the amount of the first water-soluble organic solvent is excessively large based on the amount of the resin, and therefore the resin is easily movable after the ink adheres to a recording medium, so that the marker resistance of an image is not obtained sufficiently in some cases.

The mass ratio (times) of the content (% by mass) of the first water-soluble organic solvent to the content (% by mass) of the pigment is preferably 1.00 times or more, and more preferably 1.50 times or more to 3.50 times or less.

It is to be noted that when the ink contains a first water-soluble organic solvent having a Log P value of less than −1.10, a water-soluble organic solvent having a Log P value of −1.10 or more can be further used together with the first water-soluble organic solvent. The proportion (%) of the content (% by mass) of the first water-soluble organic solvent in the content (% by mass) of all the water-soluble organic solvents in the ink can be 45.00% or more to 100.00% or less.

(Aqueous Medium)

The ink is an aqueous ink containing at least water as an aqueous medium. The aqueous medium may further contain a water-soluble organic solvent other than the first water-soluble organic solvent. As water, deionized water (ion-exchanged water) can be used. The water-soluble organic solvent is not particularly limited, and any of the water-soluble organic solvents which can be used for an inkjet ink, such as alcohols, glycols, glycol ethers and nitrogen-containing compounds which are other than the first water-soluble organic solvent, can be used. In addition, one or two or more of these water-soluble organic solvents can be contained in the ink.

The content (% by mass) of water in the ink can be 50.00% by mass or more to 95.00% by mass or less based on the total mass of the ink. In addition, the content (% by mass) of the water-soluble organic solvent in the ink can be 3.00% by mass or more to 50.00% by mass or less based on the total mass of the ink. When the content of the water-soluble organic solvent is less than 3.00% by mass, reliability such as sticking resistance is not obtained sufficiently in some cases where the ink is used for an inkjet recording apparatus. In addition, when the content of the water-soluble organic solvent exceeds 50.00% by mass, storage stability of the ink is not obtained sufficiently in some cases.

(Other Components)

If necessary, various additives such as a surfactant, a pH modifier, a defoaming agent, a rust-preventive agent, an antiseptic, an anti-mold agent, an antioxidant, an anti-reducing agent and a chelating agent may be contained in the ink. It is to be noted that the content of these additives in an ink is considerably low in general and an influence of these additives on the effect of the present invention is also small. Therefore, in the present invention, these additives are not included in the "water-soluble organic solvent" and do not correspond to the object of calculating the Log P value.

(Physical Properties of Ink)

In the present invention, the ink preferably has a viscosity at 25° C. of 1.0 mPa·s or more to 5.0 mPa·s or less, and more preferably 1.0 mPa·s or more to 3.5 mPa·s or less. In addition, the ink can have a static surface tension at a temperature of 25° C. of 28.0 mN/m or more to 45.0 mN/m or less. Further, the ink can have a pH of 7.0 or more to 9.0 or less.

EXAMPLES

Hereinafter, the present invention will be described in more detail giving Examples and Comparative Examples, but the present invention is not limited to the following Examples within the range not exceeding the scope thereof. It is to be noted that "parts" and "%" described with respect to the amount of a component are each on a mass basis unless otherwise noted.

(Preparation of Pigment Dispersion Liquid)

(Pigment Dispersion Liquid 1)

To a solution obtained by dissolving 5.0 g of concentrated hydrochloric acid in 5.5 g of water, 1.6 g of 4-amino-1,2-benene dicarboxylic acid was added at a temperature of 5° C. A solution obtained by dissolving 1.8 g of sodium nitrite in 9.0 g of water was added to the solution obtained above while the solution obtained above was stirred on an ice bath in order to keep a temperature of 10° C. or less. After the stirring was conducted for 15 minutes, 6.0 g of carbon black having a specific surface area of 220 m$^2$/g and having a DBP oil absorption of 105 mL/100 g was added thereto and mixed. After the stirring was further conducted for 15 minutes, a resultant slurry was subjected to filtration with filter paper (Standard Filter Paper No. 2, manufactured by ADVANTEC), and carbon black was sufficiently washed with water and was dried in an oven at a temperature of 110° C. Water was added to obtained carbon black to obtain a pigment dispersion liquid 1 having a content (solid content) of carbon black of 15.0%. In the pigment dispersion liquid 1, a self-dispersible pigment containing —$C_6H_3$—$(COONa)_2$ groups bonded to the surface of particles was contained. Thereafter, sodium ions were replaced with potassium ions using an ion exchange method.

(Pigment Dispersion Liquid 2)

15.0 parts of a pigment, 15.0 parts of a resin-containing liquid, and 70.0 parts of ion-exchanged water were mixed. As the pigment, carbon black was used. As the resin-containing liquid, a liquid having a content of the resin of 20.0%, the liquid obtained by neutralizing a styrene-ethyl acrylate-acrylic acid copolymer with an aqueous solution containing potassium hydroxide in an equimolar amount to the acid value of the copolymer, was used. The styrene-ethyl acrylate-acrylic acid copolymer has an acid value of 150 mgKOH/g and has a weight average molecular weight of 8,000. This mixture was dispersed for 5 hours, while being cooled with water, using a batch type vertical sand mill (manufactured by Aimex Co., Ltd.) in which 200.0 parts of a zirconia bead having a particle diameter of 0.3 mm was filled. Thereafter, this dispersion liquid was subjected to a centrifugal separation treatment to remove coarse particles and was subjected to pressure filtration with a cellulose acetate filter (manufactured by ADVANTEC) having a pore size of 3.0 μm. A pigment dispersion liquid 2 (content of pigment of 15.0% and content of resin of 3.0%) in a state in which the pigment is dispersed in water by the resin was obtained by the above-described method.

(Pigment Dispersion Liquid 3)

The type of the pigment in the preparation of the pigment dispersion liquid 2 was changed to C. I. Pigment Blue 15:3 (Hostaperm Blue B2G, manufactured by Clariant). A pigment dispersion liquid 3 (content of pigment of 15.0% and content of resin of 3.0%) in a state in which the pigment was dispersed in water by the resin was obtained by the same procedure as in the preparation of the pigment dispersion liquid 2 except for the change.

(Pigment Dispersion Liquid 4)

The type of the pigment in the preparation of the pigment dispersion liquid 2 was changed to C. I. Pigment Red 122 (Ink Jet Magenta E 02, manufactured by BASF SE). A pigment dispersion liquid 4 (content of pigment of 15.0% and content of resin of 3.0%) in a state in which the pigment was dispersed in water by the resin was obtained by the same procedure as in the preparation of the pigment dispersion liquid 2 except for the change.

(Pigment Dispersion Liquid 5)

The type of the pigment in the preparation of the pigment dispersion liquid 2 was changed to C.I. Pigment Yellow 74 (Hansa yellow SGXB, manufactured by Clariant). A pigment dispersion liquid 5 (content of pigment of 15.0% and content of resin of 3.0%) in a state in which the pigment was dispersed in water by the resin was obtained by the same procedure as in the preparation of the pigment dispersion liquid 2 except for the change.

<Preparation of Resin-Containing Liquid>

Hereinafter, any of the acrylic resins and the urethane resins is a water-soluble resin. Whether a resin is water-soluble or not was determined according to the following method. First, a liquid (solid content of resin: 10% by mass) containing a resin neutralized with an alkali (such as sodium hydroxide or potassium hydroxide) in an amount corresponding to the acid value was prepared. Subsequently, the prepared liquid was diluted 10 times (based on volume) with pure water to prepare a sample solution. The resin was rated as water-soluble in a case where a particle having a particle diameter was not measured when the particle diameter of the resin in the sample solution was measured by a dynamic light scattering method. The measurement conditions on that occasion were SetZero: 30 seconds, number of times of measurement: 3 times, and measurement time: 180 seconds. As a particle size distribution measurement apparatus, a particle size analyzer using a dynamic light scattering method ("UPA-EX150," manufactured by NIKKISO CO., LTD.) was used.

(Liquids Containing Acrylic Resins 1 to 5 Respectively)

Styrene-butyl acrylate-acrylic acid copolymers each having an acid value (mgKOH/g) described in Table 1 were prepared. The resin-containing liquid is a liquid having a content of an acrylic resin of 20.0%, the liquid obtained by neutralizing a copolymer with an aqueous solution containing potassium hydroxide in an equimolar amount to the acid value of the copolymer.

(Liquid Containing Acrylic Resin 6)

A styrene-methyl acrylate-acrylic acid copolymer having an acid value (mgKOH/g) described in Table 1 was prepared. The resin-containing liquid is a liquid having a content of the acrylic resin of 20.0%, the liquid obtained by neutralizing the copolymer with an aqueous solution containing potassium hydroxide in an equimolar amount to the acid value of the copolymer.

(Liquid Containing Acrylic Resin 7)

A benzyl acrylate-butyl acrylate-acrylic acid copolymer having an acid value (mgKOH/g) described in Table 1 was prepared. The resin-containing liquid is a liquid having a content of the acrylic resin of 20.0%, the liquid obtained by neutralizing the copolymer with an aqueous solution containing potassium hydroxide in an equimolar amount to the acid value of the copolymer.

(Liquid Containing Acrylic Resin 8)

A styrene-butyl acrylate-methacrylic acid copolymer having an acid value (mgKOH/g) described in Table 1 was prepared. The resin-containing liquid is a liquid having a content of the acrylic resin of 20.0%, the liquid obtained by neutralizing the copolymer with an aqueous solution containing potassium hydroxide in an equimolar amount to the acid value of the copolymer.

(Liquids Containing Urethane Resins 1 to 5 Respectively)

Polypropylene glycol having a number average molecular weight of 2,000 was dissolved in methyl ethyl ketone, thereafter isophorone diisocyanate and dimethylol propionic acid were added thereto, and a resultant mixture was reacted at a temperature of 75° C. for 1 hour to obtain a prepolymer solution. The obtained prepolymer solution was cooled to a temperature of 60° C., and an aqueous solution containing potassium hydroxide was added thereto to neutralize the acid group. Thereafter, the solution was cooled to a temperature of 40° C., ion-exchanged water was then added thereto, and a resultant mixture was stirred at a high speed with a homomixer to be emulsified. A chain extender was added after the emulsification and a chain-extending reaction was performed at a temperature of 30° C. for 12 hours. When the existence of an isocyanate group was not confirmed with a Fourier transform-infrared spectrophotometer (FT-IR), methyl ethyl ketone was removed from the solution while the solution was heated under reduced pressure to obtain a liquid having a content of a urethane resin of 20.0%. The acid values (mgKOH/g) are described in Table 1.

(Liquid Containing Urethane Resin 6)

A liquid having a content of a urethane resin of 20.0% was obtained by the same method as the method of preparing the liquids containing the urethane resins 1 to 5 respectively except that isophorone diisocyanate was changed to hexamethylene diisocyanate.

(Liquid Containing Urethane Resin 7)

A liquid having a content of a urethane resin of 20.0% was obtained by the same method as the method of preparing the liquids containing the urethane resins 1 to 5 respectively except that dimethylol propionic acid was changed to dimethylol butanoic acid.

(Liquid Containing Urethane Resin 8)

A liquid having a content of a urethane resin of 20.0% was obtained by the same method as the method of preparing the liquids containing the urethane resins 1 to 5 respectively except that polypropylene glycol having a number average molecular weight of 2,000 was changed to polyethylene glycol having a number average molecular weight of 2,000.

(Polyvinyl Alcohol)

As polyvinyl alcohol, PVA706 (degree of saponification of 90.5 to 92.5, manufactured by KURARAY CO., LTD.) was used.

TABLE 1

| Property of resin | |
|---|---|
| | Acid value (mgKOH/g) |
| Acrylic resin 1 | 120 |
| Acrylic resin 2 | 60 |
| Acrylic resin 3 | 300 |
| Acrylic resin 4 | 50 |
| Acrylic resin 5 | 310 |
| Acrylic resin 6 | 120 |
| Acrylic resin 7 | 120 |
| Acrylic resin 8 | 120 |
| Urethane resin 1 | 70 |
| Urethane resin 2 | 50 |
| Urethane resin 3 | 100 |
| Urethane resin 4 | 40 |
| Urethane resin 5 | 110 |
| Urethane resin 6 | 70 |
| Urethane resin 7 | 70 |
| Urethane resin 8 | 70 |

[Method of Measuring Acid Value]

The acid values for the acrylic resins and the urethane resins individually dissolved in tetrahydrofuran were measured using an automatic potentiometric titration apparatus (AT-510, manufactured by Kyoto Electronics Manufacturing Co., Ltd.) loaded with a streaming potential titration unit (PCD-500) by colloidal titration utilizing potential difference. On that occasion, as a titrant, an ethanol solution containing potassium hydroxide was used.

[Method of Measuring Weight Average Molecular Weight]

The weight average molecular weight of the acrylic resins and the urethane resins was measured by GPC in the manner as described below. A resin was dissolved in tetrahydrofuran (THF) at a temperature of 25° C. in 24 hours. An obtained solution was filtrated with a membrane filter to obtain a sample solution. The concentration of components soluble to THF in the sample solution was adjusted to be about 0.3%. The weight average molecular weight of the resins was measured using this sample solution under the following conditions.

Apparatus: Waters2695 Separations Module, manufactured by Waters Corporation
RI detector: 2414detector, manufactured by Waters Corporation
Columns: four columns of KF-806M, manufactured by Showa Denko K.K.
Eluent: tetrahydrofuran (THF)
Flow rate: 1.0 mL/min
Oven temperature: temperature of 40° C.
Amount of sample injected: 100 μL In calculating the weight average molecular weight of the resins, a molecular weight calibration curve made using standard polystyrene resins (TSK Standard Polystyrenes F-850, F-450, F-288, F-128, F-80, F-40, F-20, F-10, F-4, F-2, F-1, A-5000, A-2500, A-1000 and A-500, manufactured by Tosoh Corporation) was used.

The weight average molecular weight of the acrylic resins used was 3,000 or more and 15,000 or less. The weight average molecular weight of the urethane resins used was 25,000 or more and 75,000 or less.

<Preparation of Ink>

Respective components described in Tables 2 to 4 were mixed. On that occasion, the resins described in Table 1 were used. After stirring was conducted sufficiently, a resultant mixture was subjected to pressure filtration with a filter having a pore size of 1.2 μm to obtain an ink. The numerical values shown in parentheses in Tables 2 to 4 are Log P values. In addition, inks 1 to 35 after being prepared are unconcentrated inks (second inks) and are denoted as the second inks 1 to 35 respectively.

TABLE 2

Composition and properties of ink

| | Ink No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion liquid 1 | 40.00 | | | | | 40.00 | 40.00 | 40.00 | 40.00 | 40.00 | 40.00 | 40.00 |
| Pigment dispersion liquid 2 | | 40.00 | | | | | | | | | | |
| Pigment dispersion liquid 3 | | | 40.00 | | | | | | | | | |
| Pigment dispersion liquid 4 | | | | 40.00 | | | | | | | | |
| Pigment dispersion liquid 5 | | | | | 40.00 | | | | | | | |
| Liquid containing acrylic resin 1 | 10.00 | | | | | | | | | | | 10.00 |
| Liquid containing acrylic resin 2 | | | | | | | | | | | | |
| Liquid containing acrylic resin 3 | | | | | | | | | | | | |
| Liquid containing acrylic resin 4 | | | | | | | | | | | | |
| Liquid containing acrylic resin 5 | | | | | | | | | | | | |
| Liquid containing acrylic resin 6 | | | | | | 10.00 | | | | | | |
| Liquid containing acrylic resin 7 | | | | | | | 10.00 | | | | | |
| Liquid containing acrylic resin 8 | | | | | | | | 10.00 | | | | |
| Liquid containing urethane resin 1 | | | | | | | | | | | | |
| Liquid containing urethane resin 2 | | | | | | | | | | | | |
| Liquid containing urethane resin 3 | | | | | | | | | | | | |
| Liquid containing urethane resin 4 | | | | | | | | | | | | |
| Liquid containing urethane resin 5 | | | | | | | | | | | | |
| Liquid containing urethane resin 6 | | | | | | | | | 10.00 | | | |
| Liquid containing urethane resin 7 | | | | | | | | | | 10.00 | | |
| Liquid containing urethane resin 8 | | | | | | | | | | | 10.00 | |
| Polyvinyl alcohol | | | | | | | | | | | | |
| Triethylene glycol (−1.65) | 12.00 | 12.00 | 12.00 | 12.00 | 12.00 | 12.00 | 12.00 | 12.00 | 12.00 | 12.00 | 12.00 | |
| Polyethylene glycol 400 (−2.94) | | | | | | | | | | | | 12.00 |
| Polyethylene glycol 1000 (−6.23) | | | | | | | | | | | | |
| Ethylene urea (−1.24) | | | | | | | | | | | | |
| Diethylene glycol (−1.41) | | | | | | | | | | | | |
| 1,3-Propane diol (−1.09) | | | | | | | | | | | | |
| Trimethylolpropane (−0.97) | 12.00 | 12.00 | 12.00 | 12.00 | 12.00 | 12.00 | 12.00 | 12.00 | 12.00 | 12.00 | 12.00 | 12.00 |
| ACETYLENOL E60 | 0.45 | 0.45 | 0.45 | 0.45 | 0.45 | 0.45 | 0.45 | 0.45 | 0.45 | 0.45 | 0.45 | 0.45 |
| Ion-exchanged water | 25.55 | 35.55 | 35.55 | 35.55 | 35.55 | 25.55 | 25.55 | 25.55 | 25.55 | 25.55 | 25.55 | 25.55 |
| Content (%) of pigment | 6.00 | 6.00 | 6.00 | 6.00 | 6.00 | 6.00 | 6.00 | 6.00 | 6.00 | 6.00 | 6.00 | 6.00 |
| Content (%) of resin | 2.00 | 1.20 | 1.20 | 1.20 | 1.20 | 2.00 | 2.00 | 2.00 | 2.00 | 2.00 | 2.00 | 2.00 |
| Content (%) of first water-soluble organic solvent | 12.00 | 12.00 | 12.00 | 12.00 | 12.00 | 12.00 | 12.00 | 12.00 | 12.00 | 12.00 | 12.00 | 12.00 |
| Total content (%) of water-soluble organic solvents | 24.00 | 24.00 | 24.00 | 24.00 | 24.00 | 24.00 | 24.00 | 24.00 | 24.00 | 24.00 | 24.00 | 24.00 |
| Proportion (%) of first water-soluble organic solvent in all the water-soluble organic solvents | 50.00 | 50.00 | 50.00 | 50.00 | 50.00 | 50.00 | 50.00 | 50.00 | 50.00 | 50.00 | 50.00 | 50.00 |
| Content of first water-soluble organic solvent/content of resin (times) | 6.00 | 10.00 | 10.00 | 10.00 | 10.00 | 6.00 | 6.00 | 6.00 | 6.00 | 6.00 | 6.00 | 6.00 |
| Content of first water-soluble organic solvent/content of pigment (times) | 2.00 | 2.00 | 2.00 | 2.00 | 2.00 | 2.00 | 2.00 | 2.00 | 2.00 | 2.00 | 2.00 | 2.00 |

TABLE 3

Composition and properties of ink

| | Ink No. | | | | | | | | | | |
|---|---|---|---|---|---|---|---|---|---|---|---|
| | 13 | 14 | 15 | 16 | 17 | 18 | 19 | 20 | 21 | 22 | 23 |
| Pigment dispersion liquid 1 | 40.00 | 40.00 | 40.00 | 40.00 | 40.00 | 40.00 | 40.00 | 40.00 | 40.00 | 40.00 | 40.00 |
| Pigment dispersion liquid 2 | | | | | | | | | | | |
| Pigment dispersion liquid 3 | | | | | | | | | | | |
| Pigment dispersion liquid 4 | | | | | | | | | | | |
| Pigment dispersion liquid 5 | | | | | | | | | | | |
| Liquid containing acrylic resin 1 | 10.00 | 10.00 | 10.00 | 5.00 | 10.00 | | | | | | |
| Liquid containing acrylic resin 2 | | | | | | | | | 10.00 | | |
| Liquid containing acrylic resin 3 | | | | | | | | | | 10.00 | |

TABLE 3-continued

Composition and properties of ink

| | Ink No. | | | | | | | | | | |
|---|---|---|---|---|---|---|---|---|---|---|---|
| | 13 | 14 | 15 | 16 | 17 | 18 | 19 | 20 | 21 | 22 | 23 |
| Liquid containing acrylic resin 4 | | | | | | | 10.00 | | | | |
| Liquid containing acrylic resin 5 | | | | | | | | | | | 10.00 |
| Liquid containing acrylic resin 6 | | | | | | | | | | | |
| Liquid containing acrylic resin 7 | | | | | | | | | | | |
| Liquid containing acrylic resin 8 | | | | | | | | | | | |
| Liquid containing urethane resin 1 | | | | 5.00 | | | | | | | 10.00 |
| Liquid containing urethane resin 2 | | | | | | | | | | | |
| Liquid containing urethane resin 3 | | | | | | | | | | | |
| Liquid containing urethane resin 4 | | | | | | | | | | | |
| Liquid containing urethane resin 5 | | | | | | | | | | | |
| Liquid containing urethane resin 6 | | | | | | | | | | | |
| Liquid containing urethane resin 7 | | | | | | | | | | | |
| Liquid containing urethane resin 8 | | | | | | | | | | | |
| Polyvinyl alcohol | | | | | | 2.00 | | | | | |
| Triethylene glycol (−1.65) | | | | 12.00 | | 12.00 | 12.00 | 12.00 | 12.00 | 12.00 | 12.00 |
| Polyethylene glycol 400 (−2.94) | | | | | | | | | | | |
| Polyethylene glycol 1000 (−6.23) | 12.00 | | | | | | | | | | |
| Ethylene urea (−1.24) | | 12.00 | | | | | | | | | |
| Diethylene glycol (−1.41) | | | 12.00 | | | | | | | | |
| 1,3-Propane diol (−1.09) | | | | | | | | | | | |
| Trimethylolpropane (−0.97) | 12.00 | 12.00 | 12.00 | 12.00 | 24.00 | 12.00 | 12.00 | 12.00 | 12.00 | 12.00 | 12.00 |
| ACETYLENOL E60 | 0.45 | 0.45 | 0.45 | 0.45 | 0.45 | 0.45 | 0.45 | 0.45 | 0.45 | 0.45 | 0.45 |
| Ion-exchanged water | 25.55 | 25.55 | 25.55 | 25.55 | 25.55 | 33.55 | 25.55 | 25.55 | 25.55 | 25.55 | 25.55 |
| Content (%) of pigment | 6.00 | 6.00 | 6.00 | 6.00 | 6.00 | 6.00 | 6.00 | 6.00 | 6.00 | 6.00 | 6.00 |
| Content (%) of resin | 2.00 | 2.00 | 2.00 | 2.00 | 2.00 | 2.00 | 2.00 | 2.00 | 2.00 | 2.00 | 2.00 |
| Content (%) of first water-soluble organic solvent | 12.00 | 12.00 | 12.00 | 12.00 | 0.00 | 12.00 | 12.00 | 12.00 | 12.00 | 12.00 | 12.00 |
| Total content (%) of water-soluble organic solvents | 24.00 | 24.00 | 24.00 | 24.00 | 24.00 | 24.00 | 24.00 | 24.00 | 24.00 | 24.00 | 24.00 |
| Proportion (%) of first water-soluble organic solvent in all the water-soluble organic solvents | 50.00 | 50.00 | 50.00 | 50.00 | 50.00 | 50.00 | 50.00 | 50.00 | 50.00 | 50.00 | 50.00 |
| Content of first water-soluble organic solvent/content of resin (times) | 6.00 | 6.00 | 6.00 | 6.00 | 0.00 | 6.00 | 6.00 | 6.00 | 6.00 | 6.00 | 6.00 |
| Content of first water-soluble organic solvent/content of pigment (times) | 2.00 | 2.00 | 2.00 | 2.00 | 0.00 | 2.00 | 2.00 | 2.00 | 2.00 | 2.00 | 2.00 |

Composition and properties of ink

| | Ink No. | | | | | | | | | | | |
|---|---|---|---|---|---|---|---|---|---|---|---|---|
| | 24 | 25 | 26 | 27 | 28 | 29 | 30 | 31 | 32 | 33 | 34 | 35 |
| Pigment dispersion liquid 1 | 40.00 | 40.00 | 40.00 | 40.00 | 40.00 | 40.00 | 40.00 | 40.00 | 40.00 | 40.00 | 40.00 | |
| Pigment dispersion liquid 2 | | | | | | | | | | | | 40.00 |
| Pigment dispersion liquid 3 | | | | | | | | | | | | |
| Pigment dispersion liquid 4 | | | | | | | | | | | | |
| Pigment dispersion liquid 5 | | | | | | | | | | | | |
| Liquid containing acrylic resin 1 | | | | | 32.55 | 32.50 | 2.40 | 2.00 | | 10.00 | | 10.00 |
| Liquid containing acrylic resin 2 | | | | | | | | | | | | |
| Liquid containing acrylic resin 3 | | | | | | | | | | | | |
| Liquid containing acrylic resin 4 | | | | | | | | | | | | |
| Liquid containing acrylic resin 5 | | | | | | | | | | | | |
| Liquid containing acrylic resin 6 | | | | | | | | | | | | |
| Liquid containing acrylic resin 7 | | | | | | | | | | | | |
| Liquid containing acrylic resin 8 | | | | | | | | | | | | |
| Liquid containing urethane resin 1 | | | | | | | | | | | | |
| Liquid containing urethane resin 2 | | 10.00 | | | | | | | | | | |
| Liquid containing urethane resin 3 | | | 10.00 | | | | | | | | | |
| Liquid containing urethane resin 4 | 10.00 | | | | | | | | | | | |
| Liquid containing urethane resin 5 | | | | 10.00 | | | | | | | | |
| Liquid containing urethane resin 6 | | | | | | | | | | | | |
| Liquid containing urethane resin 7 | | | | | | | | | | | | |
| Liquid containing urethane resin 8 | | | | | | | | | | | | |

-continued

Composition and properties of ink

| | Ink No. | | | | | | | | | | | |
|---|---|---|---|---|---|---|---|---|---|---|---|---|
| | 24 | 25 | 26 | 27 | 28 | 29 | 30 | 31 | 32 | 33 | 34 | 35 |
| Polyvinyl alcohol | | | | | | | | | 0.40 | | | |
| Triethylene glycol (−1.65) | 12.00 | 12.00 | 12.00 | 12.00 | 12.00 | 12.00 | 12.00 | 12.00 | | | 12.00 | 12.00 |
| Polyethylene glycol 400 (−2.94) | | | | | | | | | | | | |
| Polyethylene glycol 1000 (−6.23) | | | | | | | | | | | | |
| Ethylene urea (−1.24) | | | | | | | | | 12.00 | | | |
| Diethylene glycol (−1.41) | | | | | | | | | | | | |
| 1,3-Propane diol (−1.09) | | | | | | | | | | 24.00 | | |
| Trimethylolpropane (−0.97) | 12.00 | 12.00 | 12.00 | 12.00 | 12.00 | 12.00 | 12.00 | 12.00 | 12.00 | | 12.00 | 12.00 |
| ACETYLENOL E60 | 0.45 | 0.45 | 0.45 | 0.45 | 0.45 | 0.45 | 0.45 | 0.45 | 0.45 | 0.45 | 0.45 | 0.45 |
| Ion-exchanged water | 25.55 | 25.55 | 25.55 | 25.55 | 3.00 | 3.05 | 33.15 | 33.55 | 35.15 | 25.55 | 35.55 | 25.55 |
| Content (%) of pigment | 6.00 | 6.00 | 6.00 | 6.00 | 6.00 | 6.00 | 6.00 | 6.00 | 6.00 | 6.00 | 6.00 | 6.00 |
| Content (%) of resin | 2.00 | 2.00 | 2.00 | 2.00 | 6.51 | 6.50 | 0.48 | 0.40 | 0.40 | 2.00 | 0.00 | 3.20 |
| Content (%) of first water-soluble organic solvent | 12.00 | 12.00 | 12.00 | 12.00 | 12.00 | 12.00 | 12.00 | 12.00 | 12.00 | 0.00 | 12.00 | 12.00 |
| Total content (%) of water-soluble organic solvents | 24.00 | 24.00 | 24.00 | 24.00 | 24.00 | 24.00 | 24.00 | 24.00 | 24.00 | 24.00 | 24.00 | 24.00 |
| Proportion (%) of first water-soluble organic solvent in all the water-soluble organic solvents | 50.00 | 50.00 | 50.00 | 50.00 | 50.00 | 50.00 | 50.00 | 50.00 | 50.00 | 50.00 | 50.00 | 50.00 |
| Content of first water-soluble organic solvent/content of resin (times) | 6.00 | 6.00 | 6.00 | 6.00 | 1.84 | 1.85 | 25.00 | 30.00 | — | 0.00 | — | 3.75 |
| Content of first water-soluble organic solvent/content of pigment (times) | 2.00 | 2.00 | 2.00 | 2.00 | 2.00 | 2.00 | 2.00 | 2.00 | 2.00 | 0.00 | 2.00 | 2.00 |

<Evaluation>

Evaluation was conducted in an environment at a temperature of 5° C. Each ink was filled in a main tank 1 of an inkjet recording apparatus having a main section illustrated in FIGURE. The volume of the main tank was 200 g, and the volume excluding the volume of the main tank was 145 g. The ink was concentrated for a certain period of time by circulating the ink at a rate (flow rate) of 5 mL/min using a circulation pump 4 illustrated in FIGURE. Respective concentrated inks are denoted as the first inks 1 to 35. In Reference Examples 4 and 5, the circulation pump 4 was not used, and therefore the first ink 33 and the first ink 1 were not concentrated.

The difference in the content of water between the first ink and the second ink was calculated in the following manner. The content of water in the first ink taken out of the recording head and the content of water in the second ink taken out of the main tank were measured using a Karl Fischer moisture titrator (MKC-510, manufactured by Kyoto Electronics Manufacturing Co., Ltd.). On that occasion, as a titrant, HYDRANAL-Composite 534805-1L-R was used. The difference in the content of water between the first ink and the second ink was calculated from the values of the content of water in each ink of the first ink and the second ink.

In the present invention, A or B denotes an acceptable level, and C denotes an unacceptable level. Evaluation results are described in Table 5. It is to be noted that both of Example 1 and Reference Example 5, in which the ink composition is the same but whether the ink was circulated or not is different, were rated as rank A in image density unevenness. However, when an evaluation of removing a stuck ink by sucking the ink from clogged ejection orifices was conducted after the recording head was left to stand for several months, Example 1 in which the ink was circulated exhibited a relatively more favorable result than Reference Example 5 in which the ink was not circulated.

(Ejection Stability)

As the recording head, a line head obtained by arranging in a staggered manner recording element substrates each having a number of nozzles of 1024, a nozzle density per nozzle array of 600 dpi and an amount of ejection of the ink per nozzle of 5 ng was used. After the ink was circulated till the difference in the content of water between the first ink and the second ink reached the value described in Table 5, the second ink which was not concentrated was filled in the main tank. Thereafter, a solid image was recorded on the whole surface of one sheet of A4-sized recording medium under the condition of imparting three ink droplets to a unit area of 1/600 inches×1/600 inches. As the recording medium, plain paper (high-quality exclusive paper HR-101S, manufactured by Canon Inc.) was used. In a case where an unrecorded region exists in the solid image, the ink is not supplied into the recording head. The solid image was visually checked to evaluate the ejection stability of the ink according to the following evaluation criteria.

A: An unrecorded region does not exist in the solid image
B: An unrecorded region or unrecorded regions exist in the solid image and account for 5% or less of the solid image
C: An unrecorded region or unrecorded regions exist in the solid image and account for more than 5% of the solid image.

(Marker Resistance)

As the recording head, a line head obtained by arranging in a staggered manner recording element substrates each having a number of nozzles of 1024, a nozzle density per nozzle array of 600 dpi and an amount of ejection of the ink per nozzle of 5 ng was used. After the ink was circulated till the difference in the content of water between the first ink and the second ink reached the value described in Table 5, the second ink which was not concentrated was filled in the main tank, and a vertical ruled line having a thickness of 1/10 inches was recorded. As the recording medium, plain paper (PPC paper GF-550, manufactured by Canon Inc.) was used.

Marking was performed on the resultant vertical ruled line 30 seconds after the recording using a yellow line marker (OPTEX2, manufactured by ZEBRA CO., LTD.), and immediately after that, marking was performed on a white background part of the recording medium. Contamination of the pen tip of the marker and a blot or blots in the marking in the white background part were checked to evaluate the marker resistance according to the following evaluation criteria.

A: The pen tip of the marker is not contaminated, and a blot does not exist in the white background part where marking was performed
B: The pen tip of the marker is contaminated, but a blot does not exist in the white background part where marking was performed
C: The pen tip of the marker is contaminated, and a blot or blots exist in the white background part where marking was conducted.

TABLE 5

Evaluation conditions and evaluation results

| | First ink No. | Second ink No. | Content (%) of water in first ink | Content (%) of water in second ink | Difference in content of water between first ink and second ink (&) | Circulation | Ejection stability | Marker resistance |
|---|---|---|---|---|---|---|---|---|
| Example 1 | 1 | 1 | 22.55 | 25.55 | 3.00 | Circulated | A | A |
| Example 2 | 2 | 2 | 32.55 | 35.55 | 3.00 | Circulated | A | A |
| Example 3 | 3 | 3 | 32.55 | 35.55 | 3.00 | Circulated | A | A |
| Example 4 | 4 | 4 | 32.55 | 35.55 | 3.00 | Circulated | A | A |
| Example 5 | 5 | 5 | 32.55 | 35.55 | 3.00 | Circulated | A | A |
| Example 6 | 6 | 6 | 22.55 | 25.55 | 3.00 | Circulated | A | A |
| Example 7 | 7 | 7 | 22.55 | 25.55 | 3.00 | Circulated | A | A |
| Example 8 | 8 | 8 | 22.55 | 25.55 | 3.00 | Circulated | A | A |
| Example 9 | 9 | 9 | 22.55 | 25.55 | 3.00 | Circulated | A | A |
| Example 10 | 10 | 10 | 22.55 | 25.55 | 3.00 | Circulated | A | A |
| Example 11 | 11 | 11 | 22.55 | 25.55 | 3.00 | Circulated | A | A |
| Example 12 | 12 | 12 | 22.55 | 25.55 | 3.00 | Circulated | A | A |
| Example 13 | 13 | 13 | 22.55 | 25.55 | 3.00 | Circulated | A | A |
| Example 14 | 14 | 14 | 22.55 | 25.55 | 3.00 | Circulated | A | B |
| Example 15 | 15 | 15 | 22.55 | 25.55 | 3.00 | Circulated | A | B |
| Example 16 | 1 | 1 | 23.55 | 25.55 | 2.00 | Circulated | A | A |
| Example 17 | 1 | 1 | 19.55 | 25.55 | 6.00 | Circulated | A | A |
| Example 18 | 16 | 16 | 22.55 | 25.55 | 3.00 | Circulated | A | A |
| Example 19 | 17 | 1 | 22.55 | 25.55 | 3.00 | Circulated | B | A |
| Example 20 | 18 | 18 | 30.55 | 33.55 | 3.00 | Circulated | A | B |
| Example 21 | 19 | 19 | 22.55 | 25.55 | 3.00 | Circulated | B | A |
| Example 22 | 20 | 20 | 22.55 | 25.55 | 3.00 | Circulated | A | A |
| Example 23 | 21 | 21 | 22.55 | 25.55 | 3.00 | Circulated | A | A |
| Example 24 | 22 | 22 | 22.55 | 25.55 | 3.00 | Circulated | A | B |
| Example 25 | 23 | 23 | 22.55 | 25.55 | 3.00 | Circulated | A | A |
| Example 26 | 24 | 24 | 22.55 | 25.55 | 3.00 | Circulated | B | A |
| Example 27 | 25 | 25 | 22.55 | 25.55 | 3.00 | Circulated | A | A |
| Example 28 | 26 | 26 | 22.55 | 25.55 | 3.00 | Circulated | A | A |
| Example 29 | 27 | 27 | 22.55 | 25.55 | 3.00 | Circulated | A | B |
| Example 30 | 28 | 28 | 0.00 | 3.00 | 3.00 | Circulated | B | A |
| Example 31 | 29 | 29 | 0.05 | 3.05 | 3.00 | Circulated | A | A |
| Example 32 | 30 | 30 | 30.15 | 33.15 | 3.00 | Circulated | A | A |
| Example 33 | 31 | 31 | 30.55 | 33.55 | 3.00 | Circulated | A | B |
| Example 34 | 32 | 32 | 32.15 | 35.15 | 3.00 | Circulated | B | B |
| Example 35 | 35 | 35 | 22.55 | 25.55 | 3.00 | Circulated | A | A |
| Comparative Example 1 | 33 | 33 | 22.55 | 25.55 | 3.00 | Circulated | C | A |
| Reference Example 1 | 34 | 34 | 32.55 | 35.55 | 3.00 | Circulated | A | C |
| Reference Example 2 | 33 | 33 | 24.55 | 25.55 | 1.00 | Circulated | A | A |
| Reference Example 3 | 1 | 1 | 24.55 | 25.55 | 1.00 | Circulated | A | A |
| Reference Example 4 | 33 | 33 | 25.55 | 25.55 | 0.00 | Not circulated | A | A |
| Reference Example 5 | 1 | 1 | 25.55 | 25.55 | 0.00 | Not circulated | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-015199, filed Jan. 31, 2018, which is hereby incorporated by reference herein in its entirety.

What is claimed is:
1. An inkjet recording method comprising:
ejecting an aqueous ink using an inkjet recording apparatus comprising (i) an ink circulation channel in which a first ink circulates, (ii) an ink supply channel supplying a second ink from an ink storage portion to the ink circulation channel, and (iii) a recording head communicating with the ink circulation channel, the inkjet recording apparatus being configured to eject the aque- ous ink comprising the first ink and the second ink from the recording head, thereby recording an image on a recording medium, wherein a difference between a content (% by mass) of water in the first ink and a content (% by mass) of water in the second ink is 2.00% by mass or more, wherein the first ink comprises a resin, wherein the second ink comprises a first water-soluble organic solvent having a Log P value of less than −1.10, and wherein a mass ratio (times) of a content (% by mass) of the first water-soluble organic solvent in the second ink to a content (% by mass) of the resin in the second ink is 1.85 times or more to 25.00 times or less.

2. The inkjet recording method according to claim 1, wherein the first ink is a concentrated ink having a lower content of water than the second ink.

3. The inkjet recording method according to claim 1, wherein the first water-soluble organic solvent has a Log P value of −1.20 or less.

4. The inkjet recording method according to claim 1, wherein the resin is at least one selected from the group consisting of an acrylic resin and a urethane resin.

5. The inkjet recording method according to claim 4, wherein the acrylic resin has an acid value (mgKOH/g) of 60 mgKOH/g or more to 300 mgKOH/g or less.

6. The inkjet recording method according to claim 4, wherein the urethane resin has an acid value (mgKOH/g) of 50 mgKOH/g or more to 100 mgKOH/g or less.

7. The inkjet recording method according to claim 1, wherein the first water-soluble organic solvent is polyethylene glycol having three or more ethylene oxide structures.

8. The inkjet recording method according to claim 1, wherein the content (% by mass) of the resin in the first ink is 1.00% by mass or more to 8.00% by mass or less based on the total mass of the ink.

9. The inkjet recording method according to claim 1, wherein the content (% by mass) of the first water-soluble organic solvent in the second ink is 1.00% by mass or more to 30.00% by mass or less based on the total mass of the ink.

10. The inkjet recording method according to claim 1, wherein the second ink further comprises a pigment.

11. The inkjet recording method according to claim 1, wherein the recording head is a line head.

12. The inkjet recording method according to claim 1, wherein a flow speed of the first ink in the ink circulation channel is set to 1 to 50 mL/min.

13. An inkjet recording apparatus comprising:
(a) an aqueous ink comprising a first ink and a second ink;
(b) an ink circulation channel for circulating the first ink;
(c) an ink supply channel for supplying the second ink from an ink storage portion to the ink circulation channel; and
(d) a recording head communicating with the ink circulation channel, wherein the apparatus is configured to eject the aqueous ink comprising the first ink and the second ink from the recording head, wherein a difference between a content (% by mass) of water in the first ink and a content (% by mass) of water in the second ink is 2.00% by mass or more, wherein the first ink comprises a resin, wherein the second ink comprises a first water-soluble organic solvent having a Log P value of less than −1.10 and wherein a mass ratio (times) of a content (% by mass) of the first water-soluble organic solvent in the second ink to a content (% by mass) of the resin in the second ink is 1.85 times or more to 25.00 times or less.

* * * * *